United States Patent [19]

Mendelsohn et al.

[11] Patent Number: 5,900,042
[45] Date of Patent: May 4, 1999

[54] METHOD FOR THE REMOVAL OF ELEMENTAL MERCURY FROM A GAS STREAM

[75] Inventors: Marshall H. Mendelsohn, Downers Grove; Hann-Sheng Huang, Darien, both of Ill.

[73] Assignee: The United States of America as represented by the United States Department of Energy, Washington, D.C.

[21] Appl. No.: 08/912,582

[22] Filed: Aug. 18, 1997

[51] Int. Cl.[6] .................................................. C22B 3/10
[52] U.S. Cl. ........................... 75/742; 96/234; 423/107
[58] Field of Search ........................... 75/670–717, 742; 423/210, 593, 107; 96/234

[56] References Cited

U.S. PATENT DOCUMENTS

| | | | |
|---|---|---|---|
| 5,328,673 | 7/1994 | Kaczur et al. | 423/235 |
| 5,569,436 | 10/1996 | Lerner et al. | 422/170 |
| 5,575,982 | 11/1996 | Reiss et al. | 423/210 |
| 5,607,496 | 3/1997 | Brooks | 75/670 |

OTHER PUBLICATIONS

"Reactions of Gaseous Elemental Mercury with Dilute Halogen Solutions" Aug. 25, 1996—M. H. Mendelsohn et al., 212th Nat'l Meeting American Chem. Soc., Orlando, FA.
Livengood, C.D. et al. "Investigation of Modified Speciation for Enhanced Control of Mercury" *Advanced Coal–Based Power and Environmental Systems '97 Conference*, Pittsburgh, PA Jul. 22–24, 1997.

*Primary Examiner*—Prince Willis
*Assistant Examiner*—Tima M. McGuthry-Banks
*Attorney, Agent, or Firm*—Joy Alwan; Thomas G. Anderson; William R. Moser

[57] ABSTRACT

A method is provided to remove elemental mercury from a gas stream by reacting the gas stream with an oxidizing solution to convert the elemental mercury to soluble mercury compounds. Other constituents are also oxidized. The gas stream is then passed through a wet scrubber to remove the mercuric compounds and oxidized constituents.

17 Claims, 4 Drawing Sheets

Summary of $Hg^0$ removal results for large–bubble tests with chlorine solutions.

| Feed–Gas Composition | Chlorine Concentration (ppm) | | | | |
|---|---|---|---|---|---|
| | 2.5 | 250 | 1,000 | 2,500 | 5,000 |
| | $Hg^0$ Removal (%) | | | | |
| $O_2+N_2+Hg^0$ | 11.6 | 14,4,13.3 | -- | 9.3 | 14.3 |
| $O_2+N_2+NO+CO_2 \div Hg^0$ | 19.0 | 20.6 [a] | 35.4,28.1 | 37 | 44.5 |
| $O_2+N_2+NO+CO_2 \div SO_2+Hg^0$ | 0.5 | 13.8 | 35.1,34 | 35.4,41 | 52.2 |

[a]15–min test as versus 30 min for other data.

FIG. 3

Summary of Hg° removal results for large-bubble tests with iodine and bromine solutions.

| Feed-Gas Composition | Hg° Removal (%) | |
|---|---|---|
| | I(12.7 ppm) | Br(250 ppm) |
| $O_2 + N_2 + Hg°$ | 41.4 | 71.1 |
| $O_2 + N_2 + NO + CO_2 \div Hg°$ | 34.9 | 50.9, 41.6 |
| $O_2 + N_2 + NO + CO_2 \div SO_2 + Hg°$ | --- | 11.8 |

FIG. 4

Summary of Hg° removal results for large-bubble tests with chlorine solutions.

| Feed-Gas Composition | Chlorine Concentration (ppm) | | | | |
|---|---|---|---|---|---|
| | 2.5 | 250 | 1,000 | 2,500 | 5,000 |
| | Hg° Removal (%) | | | | |
| $O_2+N_2+Hg°$ | 11.6 | 14.4, 13.3 | -- | 9.3 | 14.3 |
| $O_2+N_2+NO+CO_2 \div Hg°$ | 19.0 | 20.6 [a] | 35.4, 28.1 | 37 | 44.5 |
| $O_2+N_2+NO+CO_2 \div SO_2+Hg°$ | 0.5 | 13.8 | 35.1, 34 | 35.4, 41 | 52.2 |

[a] 15-min test as versus 30 min for other data.

FIG. 5

Summary of Hg° removal results for large-bubble tests with $HClO_3$ solutions.

| Feed-Gas Composition | $HClO_3$ Concentration (%) | |
|---|---|---|
| | 0.71 | 3.56 |
| | Hg° Removal (%) | |
| $O_2 + N_2 + Hg°$ | 14.0 | 26.9 |
| $O_2 + N_2 + NO + CO_2 + Hg°$ | 33.9 | 69.6 |
| $O_2 + N_2 + NO + CO_2 + SO_2 + Hg°$ | 22.8 | 48.2 |

FIG. 6

Summary of Hg° removal results for small-bubble tests with chlorine solutions.

|  | Chlorine Concentration (ppm) | | | |
| --- | --- | --- | --- | --- |
|  | 100 | 250 | 500 | 2,500 |
| Feed-Gas Composition | Hg° Removal (%) | | | |
| $O_2 + N_2 + Hg°$ | -- | 23 | -- | 22 |
| $O_2 + N_2 + NO + CO_2 + Hg°$ | 23 | 20 | 22 | 20 |
| $O_2 + N_2 + NO + CO_2 + SO_2 + Hg°$ | 18 | -- | -- | 27 |

FIG. 7

Summary of Hg° removal results for small-bubble tests with $HClO_3$ solutions.

|  | $HClO_3$ Concentration (%) | | | |
| --- | --- | --- | --- | --- |
|  | 0.356 | 0.71 | 1.78 | 3.56 |
| Feed-Gas Composition | Hg° Removal (%) | | | |
| $O_2 + N_2 + Hg°$ | -- | 44.6, 38 | -- | 40.8 |
| $O_2 + N_2 + NO + CO_2 + Hg°$ | -- | 34.5 | -- | 38 |
| $O_2 + N_2 + NO + CO_2 + SO_2 + Hg°$ | 38 | 39.9 | 47 | 38.7 |

5,900,042

METHOD FOR THE REMOVAL OF ELEMENTAL MERCURY FROM A GAS STREAM

CONTRACTUAL ORIGIN OF THE INVENTION

The United States Government has rights in this invention pursuant to Contract Number W-31-109-ENG-38 between the U.S. Department of Energy and the University of Chicago representing Argonne National Laboratory

BACKGROUND OF THE INVENTION

1. Field of the Invention

The present invention relates to the treatment of waste gases, particularly to a novel process for the removal of elemental mercury from such gases.

2. Background of the Invention

The 1990 Clean Air Act Amendments designate 189 substances as hazardous air pollutants also called "air toxics". Mercury has emerged as one of the air toxics of greatest concern. Mercury has been found in the stack emissions from U.S. power plants. Coal fired power plants account for the vast majority of the estimated total mercury emissions from all U.S. power plants. Mercury emitted from coal fired plants has been found in a variety of chemical forms, including elemental mercury and oxidized mercury compounds. Highly soluble mercuric compounds, such as mercuric chloride, are assumed to be readily removed in a wet scrubber system. However, elemental mercury, because of its very low solubility in water, has been shown not to be captured in a laboratory scale wet scrubber system. Therefore, in order to remove elemental mercury with a wet scrubber system, an additional method must be incorporated into the typical wet flue gas scrubbing process.

SUMMARY OF THE INVENTION

It is an object of the present invention to provide a method for removing elemental mercury from a gas stream by converting the elemental mercury to soluble compounds.

It is a further object of the invention to remove elemental mercury from a flue gas stream containing other constituents.

It is a further object of the invention to provide a method to remove elemental mercury without additional costly scrubbing units.

Briefly, the invention provides a method to react elemental mercury in a gas stream with an oxidizing solution to form soluble mercuric compounds, oxidize other constituents in the gas stream and further treat the gas stream to remove the mercuric compounds and oxidized constituents.

BRIEF DESCRIPTION OF THE DRAWINGS

These and other objects and advantages of the present invention will become readily apparent upon consideration of the following detailed description and attached drawings, wherein:

FIG. 3 is a tabular representation of elemental mercury removal by iodine and bromine solutions during large bubble tests.

FIG. 4 is a tabular representation of elemental mercury removal by chlorine solutions during large bubble tests.

FIG. 5 is a tabular representation of elemental mercury removal by chloric acid during large bubble tests.

FIG. 6 is a tabular representation of elemental mercury removal by chlorine during small bubble tests.

FIG. 7 is a tabular representation of elemental mercury removal by chloric acid during small bubble tests.

DETAILED DESCRIPTION OF THE INVENTION

A method has been developed to remove elemental mercury from gas streams, in particular flue gas streams containing nitrogen oxides commonly designated as "NOX" or "$NO_x$" and sulfur oxides commonly designated as "SOX" or "$SO_x$". The method converts elemental mercury to soluble mercury compounds prior to removal in an aqueous scrubber.

Figure 1:
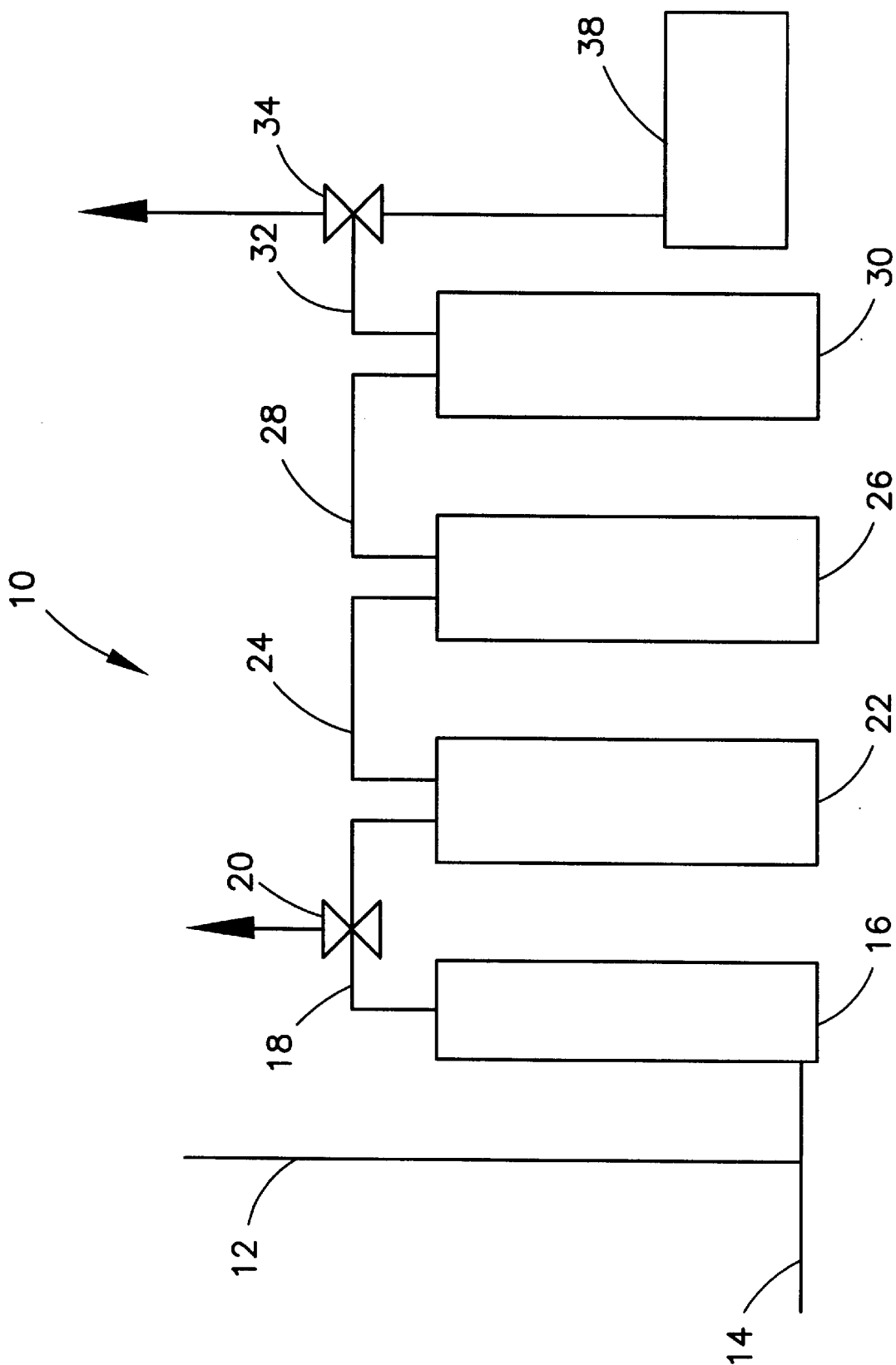
FIG. 1 represents a schematic of the bubbler apparatus.

Referring to FIG. 1, the apparatus 10 used in examples is shown. Nitrogen and elemental mercury from the permeation tube (not shown) flow through tube 12 to enter inlet tube 14. Inlet tube 14 also carries gases blended to simulate flue gas. Blended gases are composed of mixtures of nitrogen oxides, sulfur oxides, carbon oxides, oxygen, nitrogen, and water vapor. A typical gas composition would be oxygen 5%, carbon dioxide 15%, nitric oxide 250 ppm, and sulfur dioxide 1000 ppm with nitrogen making up the remainder. Typical systems are operated at a temperature range of ambient air to 400° C. The blended gases containing elemental mercury pass into flowmeter 16 where the rate of gas flow is adjusted. From the flowmeter the blended gases and mercury flow through tubing 18 and valve 20 into the first bubbler 22.

The first bubbler 22 is a cylindrical gas column filled with a solution to be tested. The blended gases enter the bubbler 22 near the bottom and bubble through the test solution. The treated gas stream then exits through the top of the bubbler. Aqueous iodine concentrations of 125 ppb, 250 ppb, and 12.7 ppm were used in the examples. Aqueous bromine at a concentration of approximately 250 ppm was also tested as were chlorine solutions of 2.5 ppm, 250 ppm, 1000 ppm, 2500 ppm, and 5000 ppm. Chloric acid was tested in concentrations from 0.356% to 3.56%. The chloric acid solutions were prepared using NOXSORB™ which has a nominal composition of 17.8% chloric acid and 22.3% sodium chlorate in water.

The blended gas stream exits the first bubbler 22 through tubing 24 and enters the second bubbler 26. The second bubbler is also filled with an aqueous solution. In the examples both the second bubbler 26 and the third bubbler 30 were filled with distilled water. From the second bubbler 26 the gas stream flows through tube 28 and into the third bubbler 30. The gas stream exits the third bubbler through tube 32 and at valve 34 either vents through tube 38 or passes to the mercury analyzer 38 through tube 36. All gas samples as well as the aqueous solutions in the second and third bubblers are analyzed for elemental mercury content.

Figure 2:
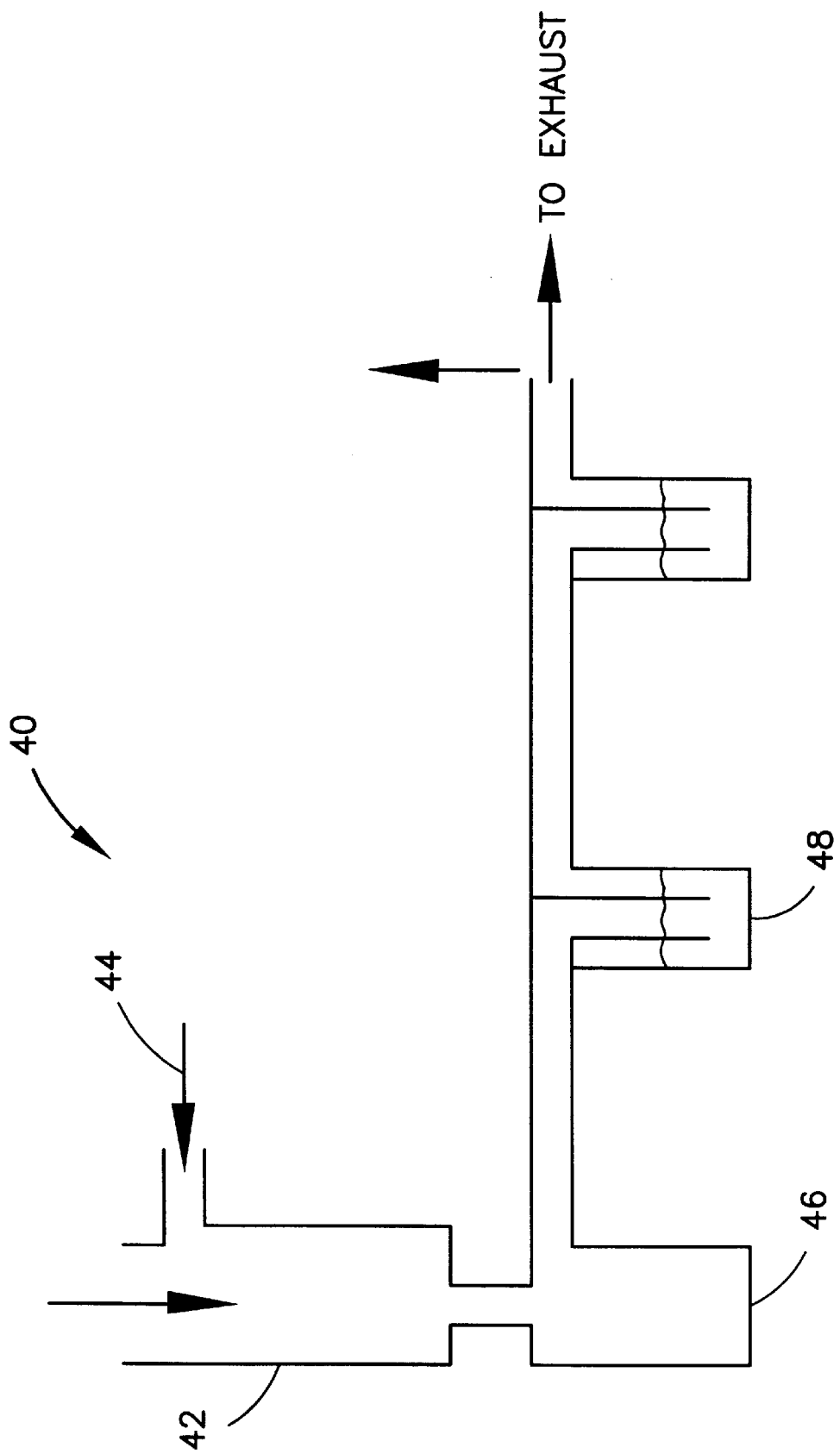
FIG. 2 represents a schematic of the test apparatus using a nozzle injection device.

Referring to FIG. 2 a pilot scale flue gas scrubber system 40 is diagramed. Flue gas flows through duct 42. The flue gas contains nitrogen oxides, sulfur oxides, carbon oxides, oxygen, nitrogen, and water vapor as well as elemental mercury. Duct 42 has a means for injecting reactive solution into the duct. This means 44 could be a two fluid nozzle, pressurized nozzle, ultrasonic nozzle, a rotary atomizer or combination thereof. The nozzle sprays a mist of reactive solution into the flue gas so that the elemental mercury is oxidized into a soluble mercuric compound. The treated flue gas travels to a wet scrubber 48. Liquid from the reactive solution and flue gas collects in the liquid collector 46. In the wet scrubber 48, the soluble mercuric compounds and other constituents are treated with aqueous solutions of calcium hydroxide, sodium carbonate, and sodium hydroxide to remove the soluble compounds. Treated flue gas is either vented from the wet scrubber or analyzed.

EXAMPLES

For these experiments, a simulated flue gas was passed through a series of three bubblers for 30 minutes. A solution of the reactive chemical to be tested was placed in the first bubbler and the degree of elemental mercury conversion was determined by comparing the amount of mercury found in the bubbler solutions with the total amount of elemental mercury fed into the flue gas. The elemental mercury concentration in the gas was typically 45 $\mu g/m^3$. The source of the elemental mercury was a calibrated and certified permeation tube which was placed in a constant temperature water bath controlled to ±0.5° C. Bottled, high purity (99.998%) nitrogen gas flowed around the permeation tube to produce a gas stream with a constant concentration of elemental mercury. This stream was then combined with another gas stream containing nitrogen and other gaseous components, such as oxygen, carbon dioxide, nitric acid, and sulfur dioxide. Carbon dioxide was used as a carrier gas for the nitric oxide. After blending, the initial gas composition was checked by using standard flue gas analyzers. Typical concentrations of the various gases were as follows: oxygen 5%, carbon dioxide 15%, nitric oxide 250 ppm, and sulfur dioxide 1000 ppm with the remainder being nitrogen as a carrier gas.

After the feed gas composition was measured and stabilized. A valve was turned to admit the gas mixture to a series of three bubblers, each containing 150 ml of solution. While the first bubbler contained the solution to be studied, the second and third bubblers usually contained distilled water. Commercial solutions of iodine, bromine, chlorine (sold as sodium hypochlorite) and chloric acid (sold as NOXSORB™) were used without further purification. Following the 30 minute test, liquid samples from each bubbler were saved for total mercury analysis. Analysis were performed by a standard cold vapor atomic absorption spectrophotometric method.

One objective of the bubbler experiment was to determine the degree to which the important reactions were occurring in the gas phase, the liquid phase, or both. However this was difficult to determine from the initial arrangement. It was assumed that the mercury found in the second bubbler was due to gas phase reactions, assuming that the liquid carryover from the first bubbler was negligible. The situation in the first bubbler was more complex. Gas phase reactions occurring inside the gas bubbles followed by rapid dissolution of products into the liquid phase could not be distinguished from gas dissolution at the gas-liquid interface followed by a rapid liquid phase reaction. To gain insight into this issue, a second series of tests were preformed, wherein the open-end (5 mm id) inlet tube in the first bubbler was replaced with a fritted glass cylinder having a coarse porosity. This gas diffuser greatly decreased the size of the bubbles passing through the liquid in the first bubbler by an order of magnitude. This increased the available gas liquid surface area.

Before any test were performed with various solutions in the first bubbler, a number of baseline tests were carried out with only distilled water in all three bubblers. When no elemental mercury was added to the gas stream, no mercury was found in any of the bubbler solutions. This result demonstrated that the system was free of mercury contamination to the detection limits (0.02 $\mu g/l$ or 0.003 $\mu g$ mercury in 150 ml of water) of the analytical method. Such baseline tests were run periodically to ensure that no mercury contamination had built up during testing.

Two tests were preformed with elemental mercury added to the feed gas stream, but with only distilled water in all three bubblers. For one test with large bubbles, amounts of mercury barely above the detection limit were found in each bubbler. This amount compared to the calculated amount of elemental mercury in the gas stream of 1.9 $\mu g$ for the 30 minute test. This result showed that the amount of elemental mercury removed using only distilled water was less than 0.3%. For a similar test with small bubbles, no mercury was found in either the first or second bubbler. Therefore it is assumed that any amount of mercury found in the bubblers above these baseline amounts must be from reactions of elemental mercury with components of the various solutions tested in the first bubbler.

To verify that the effects of other flue gas components were due to interactions with the test solutions, additional experiments were run in which the bubblers contained only water. The synthetic flue gas contained either nitrogen, oxygen, sulfur dioxide, and elemental mercury or nitrogen, oxygen, sulfur dioxide, carbon dioxide, nitric acid and elemental mercury. In both cases, less than 1% of the inlet mercury was found in the liquid phase at the end of the experiment. Therefor the flue gas species alone were not capable of significantly affecting the solubility of mercury in water.

Large Bubble Tests

Iodine solutions

A commercial preparation of 0.100N iodine solution was diluted to make up various iodine concentrations. Using a solution of about 125 ppb iodine in the first bubbler, more than 90% of the inlet mercury was retained in the bubbler solutions when only nitrogen and elemental mercury were in the feed gas stream. However, when oxygen and carbon dioxide were added to the gas mixture, elemental mercury removal was reduced to about 6%. In an effort to improve the removals, further tests were run with an iodine concentration of 250 ppb. The result for the gas stream containing only elemental mercury and nitrogen was not substantially different from the lower concentration test (81%). However, when either nitric oxide or sulfur dioxide or both were added to the gas mixture, the amount of mercury found in the bubbler solutions went either to zero for nitric acid or nitric acid with sulfur dioxide or close to zero for sulfur dioxide alone.

Two additional tests were preformed with an iodine concentration of 12.7 ppm, which was chosen such that the reagent cost would be approximately equal to that for a 250 ppm bromine solution or a 2,500 ppm chlorine solution. The results are shown in FIG. 3. It is believed that iodine concentrations from the tested 10 ppb up to the commercially available limit of approximately 10% would work.

Bromine solutions

A commercial solution containing 3% bromine by weight was used to prepare a solution containing about 250 ppm bromine. This solution was tested with three different gas compositions. Bromine is believed to work from 1 ppm to 3% which is its maximum solubility. As can be seen in FIG. 3 the highest elemental mercury removal was obtained in the test without either nitric oxide or sulfur dioxide. Adding nitric oxide to the gas mixture resulted in a significant decrease in the elemental mercury removal. Adding sulfur dioxide resulted in an even bigger decrease in the removal of elemental mercury. This decrease was presumably caused by the consumption of bromine in reactions with the two species, which in the case of dissolved sulfur dioxide would yield bromine and sulfate ions.

Chlorine solutions

Solutions of molecular chlorine are more complex than those of iodine because of the greater tendency of chlorine to disproportionate in aqueous solution to hypochlorous acid and chlorine ions. Bromine disproportionates to a greater degree than iodine but to a much lesser degree than chlorine. Commercial chlorine solutions are sold as sodium hypochlorite because, in alkaline solutions, the equilibrium between molecular chlorine and hypochlorite ions greatly favor the latter. Because of the various equilibria involved, detectable amounts of chlorine will exist in both the gas and liquid phases. FIG. 4 represents the results for the removal of mercury by chlorine solutions, which appear to depend both on the composition of the feed gas mixture and in some cases on the concentration of the chlorine solution. Chlorine is believed to work from 1 ppm to its maximum commercial limit of about 10%.

For gas mixtures containing only oxygen and nitrogen, the elemental mercury removal did not change appreciably for the different chlorine solution concentrations. For the gas mixtures containing nitric oxide plus sulfur dioxide, elemental mercury removal increased with increasing chlorine concentration. However, the rate of increase differed for the two gas mixtures. Addition of nitric oxide to the feed gas mixture appeared to have a definite positive effect on the amount of mercury transferred to the liquid phase, as compared to removals obtained with only oxygen and nitrogen present. It is believed that this is due to nitric oxide reacting with chlorine to yield nitrosyl chloride.

The results in FIG. 4 also show that when sulfur dioxide is added to the feed gas mixture, elemental mercury removal is much lower at the lower chlorine concentrations than when sulfur dioxide is not present. However, at the highest chlorine concentration studied, 5,000 ppm, the elemental mercury removal performance with sulfur dioxide present was slightly higher than the performance without sulfur dioxide.

Chloric acid solutions

Chloric acid solutions were prepared from concentrated NOXSORB™, which has a nominal composition of 17.8% chloric acid and 22.3% sodium chlorate. The results for tests with concentrations on 0.71% chloric acid and 3.56% chloric acid are shown in FIG. 5. Chloric acid is believed to work from 1 ppm to about 18%. The primary vapor phase species above these solutions are believed to be chlorine dioxide. However, chlorine dioxide is very reactive and readily photolyzes to molecular chlorine and oxygen. Also in the presence of moisture, chlorine dioxide can produce a number of different chlorine oxyacids, such as hypochlorous acid and chlorous acid. Therefore a large number of different species may be present in the vapor above a chloric acid solution.

As shown in FIG. 5, the change in elemental mercury removal from a solution of 0.71% chloric acid concentration to one with about five times higher concentration is about the same for each of the three different feed gas mixtures. In each case elemental mercury removal was about a factor or two higher with the 3.56% chloric acid solution. The gas mixture containing nitric oxide showed a substantially higher elemental mercury removal than the gas mixtures without nitric oxide. This result was similar to what was observed with chlorine solutions. However, a different chemical mechanism is believed to be responsible. The reaction of nitric oxide with chloric acid solutions may produce hydrochloric and nitric acids. Because nitric acid dissolves liquid elemental mercury, it is proposed that this gaseous by-product causes the improved elemental mercury removal when nitric oxide is present in the feed gas stream.

Contrary to the behavior observed with chlorine, it was found that for both concentrations, the presence of sulfur dioxide in the feed gas mixture reduced the elemental mercury removal by about 30% from the level without sulfur dioxide but with nitric oxide. Also in contrast to the behavior observed with chlorine solutions, it appears that within this range of chloric acid concentrations, the reduction in elemental mercury removal can not be overcome with higher chloric acid concentrations. This result points to the possibility that a mechanism different from chlorine oxidation of elemental mercury is operating for these solutions.

Small Bubble Tests

The small bubble tests were preformed to learn more about the relative importance of gas phase versus liquid phase mechanisms in the elemental mercury removal process. For a constant volume of gas, the smaller bubbles produce a larger gas liquid surface area, which is proportional to the total gas bubble surface area. It was expected that the small bubble tests might be influenced more by gas liquid interactions, in contrast to the large bubble tests where gas phase interactions would be more important.

Bromine solutions

Only two bromine tests were preformed with the small bubble apparatus. Both tests used a solution of 250 ppm bromine. One test used a feed gas mixture of oxygen plus nitrogen with the elemental mercury and gave a removal rate of 69%. A similar large bubble test gave a removal rate for elemental mercury of 71.1%. A second test used a feed gas mixture of oxygen, nitrogen, carbon dioxide, nitric oxide with the elemental mercury and gave a removal rate of 38% as compared with similar large bubble tests that gave an elemental mercury removal rate of 46.3%. There did not appear to be any significant difference between the results for the two bubble sizes.

Chlorine solutions

Results for the small bubble tests using chlorine solutions are shown in FIG. 6. The remarkable result found for these tests is that approximately the same elemental mercury removal performance (22%±3%) was observed regardless of chlorine concentration, from 100 ppm to 2,500 ppm, or gas concentration. This indicates that a single mechanism, most likely involving gas-liquid contact, is dominating elemental mercury removal under these conditions. By comparing the data in FIG. 4 and FIG. 6, it appears that the gas phase interactions become more important for higher chlorine concentrations and for feed gas mixtures containing either nitric oxide alone or nitric oxide with sulfur dioxide.

Chloric acid solutions

FIG. 7 gives results for the small bubble tests using NOXSORB™ solutions in the first bubbler. The pattern for those results is similar to what was obtained in the chlorine tests, with little variation in elemental mercury removal regardless of chloric acid concentration or gas composition. A single mechanism appears to be dominating elemental mercury removal. By comparing FIG. 5 and FIG. 7, it appears the gas phase interactions become more important at higher chloric acid concentrations and with either nitric oxide alone or nitric oxide and sulfur dioxide present in the gas stream.

While the invention has been described with reference to details of the illustrated embodiment, these details are not intended to limit the scope of the invention as defined in the appended claims.

The embodiment of the invention in which an exclusive property or privilege is claimed is defined as follows:

1. A method for removing elemental mercury from a gas stream comprising:

contacting the gas stream containing elemental mercury with an aqueous oxidizing solution for sufficient time to form soluble mercuric compounds;

contacting the gas stream containing mercuric compounds in an aqueous scrubber with an aqueous solution for sufficient time to remove the mercuric compounds; and separating the gas stream from the aqueous solution containing the mercuric compounds.

2. The method of claim 1 wherein the aqueous oxidizing solution is brought in contact with the gas stream by an injection means.

3. The method of claim 2 wherein the injection means is selected from the group consisting of a two fluid nozzle, a pressurized nozzle, an ultrasonic nozzle, a rotary atomizer and combinations thereof.

4. The method of claim 1 wherein the gas stream is contacted with the aqueous oxidizing solution in a scrubber.

5. The method of claim 1 wherein the gas stream is a flue gas stream.

6. The method of claim 1 wherein the gas stream contains constituents selected from the group consisting of nitrogen oxides, sulfur oxides, carbon oxides, oxygen, nitrogen, water vapor and combinations thereof.

7. The method of claim 1 wherein the aqueous oxidizing solution is selected from a group consisting of aqueous iodine solution, aqueous bromine solution, aqueous chlorine solution, aqueous chloric acid solution and combinations thereof.

8. The method of claim 1 wherein the aqueous oxidizing solution comprises aqueous chloric acid and an alkali metal chlorate.

9. The method of claim 1 wherein the aqueous solution in the scrubber is selected from a group consisting of solutions of calcium hydroxide, sodium carbonate, sodium hydroxide and combinations thereof.

10. The method of claim 1 wherein the constituents in the gas stream containing mercuric compounds are further contacted with an aqueous oxidizing solution for sufficient time to oxidize the constituents and the gas stream containing the mercuric compounds and oxizided constituents is then separated from the aqueous oxidizing solution prior to the aqueous scrubber.

11. A method for removing elemental mercury from a flue gas stream containing other constituents comprising:

contacting the gas stream containing elemental mercury with an aqueous oxidizing solution for sufficient time to form mercuric compounds;

contacting the gas stream containing the mercuric compounds and other constituents with an aqueous oxidizing solution for sufficient time to oxidize the other constituents;

separating the gas stream containing mercuric compounds and oxidized constituents from the aqueous oxidizing solution;

contacting the gas stream containing mercuric compounds and oxidized constituents in an aqueous scrubber with an aqueous solution for sufficient time to remove the mercuric compounds and oxidized constituents; and separating the gas stream from the aqueous solution containing the mercuric compounds.

12. The method of claim 11 wherein the gas stream constituents are selected from the group consisting of nitrogen oxides, sulfur oxides, carbon oxides, oxygen, nitrogen, water vapor and combinations thereof.

13. The method of claim 11 wherein the aqueous oxidizing solution is selected from a group consisting of aqueous iodine solution, aqueous bromine solution, aqueous chlorine solution, aqueous chloric acid solution and combinations thereof.

14. The method of claim 11 wherein the aqueous oxidizing solution comprises chloric acid and an alkali metal chlorate.

15. The method of claim 11 wherein the aqueous solution in the scrubber is selected from a group consisting of solutions of calcium hydroxide, sodium carbonate, sodium hydroxide and combinations thereof.

16. The method of claim 11 wherein the aqueous oxidizing solution is brought in contact with the gas stream by an injection means.

17. The method of claim 16 wherein the injection means is selected from the group consisting of a two fluid nozzle, a pressurized nozzle, an ultrasonic nozzle, a rotary atomizer and combinations thereof.

* * * * *